US008826082B2

United States Patent
Iwasawa et al.

(10) Patent No.: US 8,826,082 B2

(45) Date of Patent: Sep. 2, 2014

(54) OPTICAL COMMUNICATION SYSTEM, INTERFACE BOARD AND CONTROL METHOD PERFORMED IN INTERFACE BOARD

(75) Inventors: Takuya Iwasawa, Kawasaki (JP); Kenta Noda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 239 days.

(21) Appl. No.: 13/486,321

(22) Filed: Jun. 1, 2012

(65) Prior Publication Data

US 2012/0324272 A1 Dec. 20, 2012

(30) Foreign Application Priority Data

Jun. 17, 2011 (JP) ................................ 2011-135347

(51) Int. Cl.

| | |
|---|---|
| ***G06F 11/00*** | (2006.01) |
| ***H04B 10/07*** | (2013.01) |
| ***H04L 12/24*** | (2006.01) |
| ***G06F 11/20*** | (2006.01) |
| ***H04L 12/26*** | (2006.01) |

(52) U.S. Cl.

CPC ............ *H04B 10/07* (2013.01); *H04L 41/0668* (2013.01); *G06F 11/20* (2013.01); *H04L 41/0654* (2013.01); *H04L 43/0817* (2013.01)

USPC ........................................... 714/43; 714/4.12

(58) Field of Classification Search

CPC ........... G06F 11/1625; G06F 11/2033; G06F 11/3041

USPC ...................................... 714/4.12, 22, 31, 43

See application file for complete search history.

(56) References Cited

U.S. PATENT DOCUMENTS

| | | | | |
|---|---|---|---|---|
| 8,073,329 | B2 * | 12/2011 | Gao et al. | 398/66 |
| 8,386,855 | B2 * | 2/2013 | Dake | 714/48 |
| 2004/0153697 | A1 * | 8/2004 | Chang et al. | 714/4 |
| 2006/0117211 | A1 * | 6/2006 | Matsunami et al. | 714/4 |
| 2007/0036544 | A1 * | 2/2007 | Fukashiro et al. | 398/19 |
| 2007/0189663 | A1 * | 8/2007 | Hirai et al. | 385/24 |
| 2011/0311217 | A1 * | 12/2011 | Horiuchi et al. | 398/5 |

FOREIGN PATENT DOCUMENTS

| | | |
|---|---|---|
| JP | 2003-173265 | 6/2003 |

* cited by examiner

*Primary Examiner* — Joshua Lohn

(74) *Attorney, Agent, or Firm* — Antonelli, Terry, Stout & Kraus, LLP.

(57) ABSTRACT

An embodiment of the invention is an optical communication system including: a plurality of interface boards which transmit and receive optical signals to and from interface boards facing the plurality of interface boards; and a monitoring control device which monitors states of the plurality of interface boards. A first interface board of the plurality of interface boards includes: a replacement unit capable of monitoring the states of the plurality of interface boards on behalf of the monitoring control device and independently receiving supply of power; and a control unit configured to start the replacement unit in a case where a fault occurs in the monitoring control device and stop or halt the replacement unit in a case where there is no fault in the monitoring control device.

15 Claims, 16 Drawing Sheets

NODE DEVICE
INTERFACE BOARD
INTERFACE BOARD
INTERFACE BOARD
MONITORING CONTROL DEVICE
MONITORING TERMINAL
MONITORING CONTROL CENTER
106
107
110
108
206
104
314
314
101
102
103
105
206
314
314

MONITORING TERMINAL
107
MONITORING NETWORK
110
104 (OR 103)
106 (OR 105)
MONITORING CONTROL DEVICE
202
MONITORING NETWORK/TERMINAL COMMUNICATION UNIT
205
CONTROL UNIT
201
INTERFACE BOARD COMMUNICATION UNIT
203
INTERFACE BOARD INFORMATION STORAGE UNIT
204
NETWORK CONFIGURATION INFORMATION STORAGE UNIT
206 (OR 314)
INTERFACE BOARD (IN OWN NODE)
NODE DEVICE

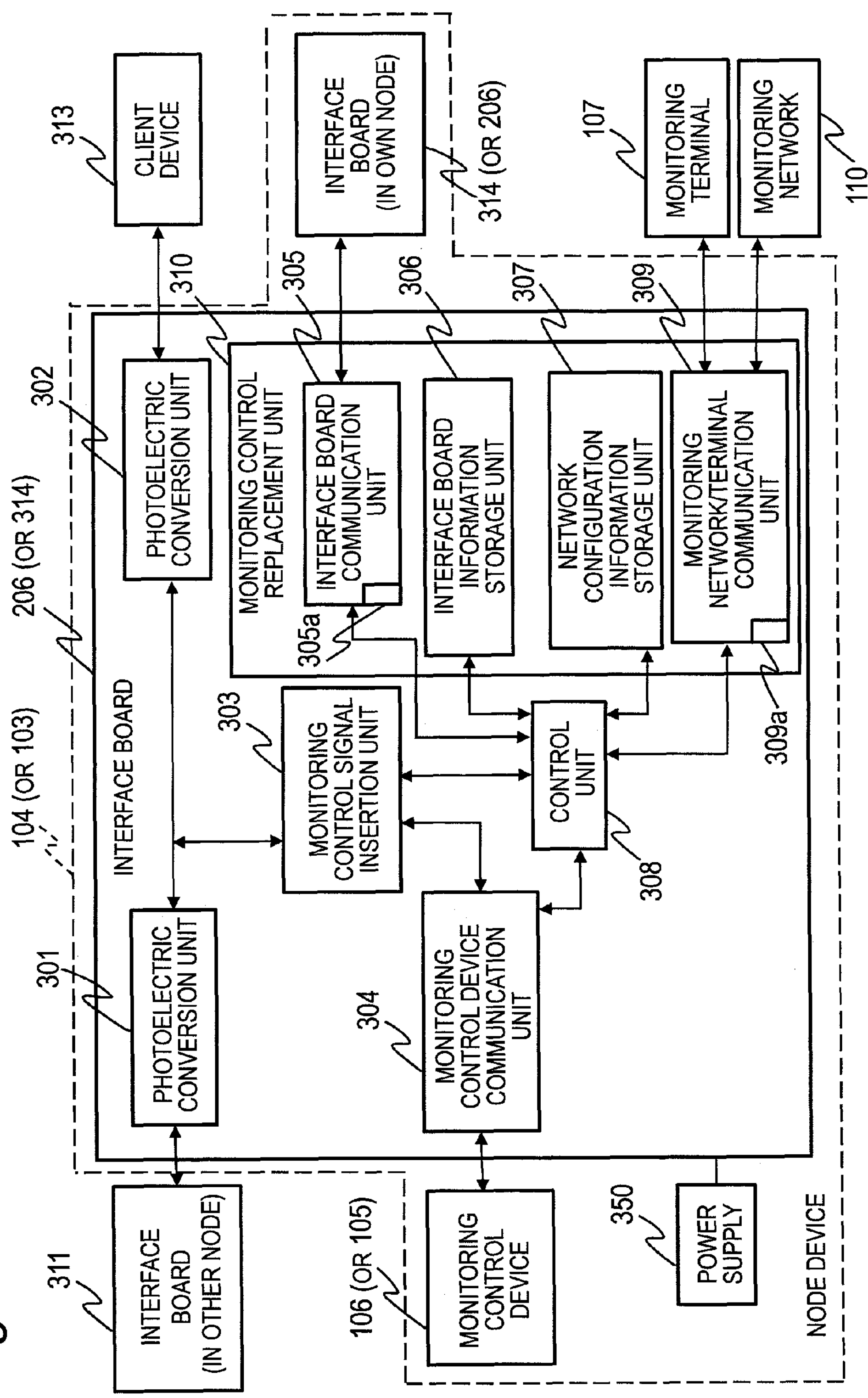
Fig. 3A
CLIENT DEVICE
313
INTERFACE BOARD (IN OWN NODE)
314 (OR 206)
MONITORING TERMINAL
107
MONITORING NETWORK
110
302
310
305
306
307
309
206 (OR 314)
PHOTOELECTRIC CONVERSION UNIT
MONITORING CONTROL REPLACEMENT UNIT
INTERFACE BOARD COMMUNICATION UNIT
INTERFACE BOARD INFORMATION STORAGE UNIT
NETWORK CONFIGURATION INFORMATION STORAGE UNIT
MONITORING NETWORK/TERMINAL COMMUNICATION UNIT
305a
309a
104 (OR 103)
INTERFACE BOARD
303
MONITORING CONTROL SIGNAL INSERTION UNIT
CONTROL UNIT
308
301
PHOTOELECTRIC CONVERSION UNIT
304
MONITORING CONTROL DEVICE COMMUNICATION UNIT
311
INTERFACE BOARD (IN OTHER NODE)
106 (OR 105)
MONITORING CONTROL DEVICE
350
POWER SUPPLY
NODE DEVICE

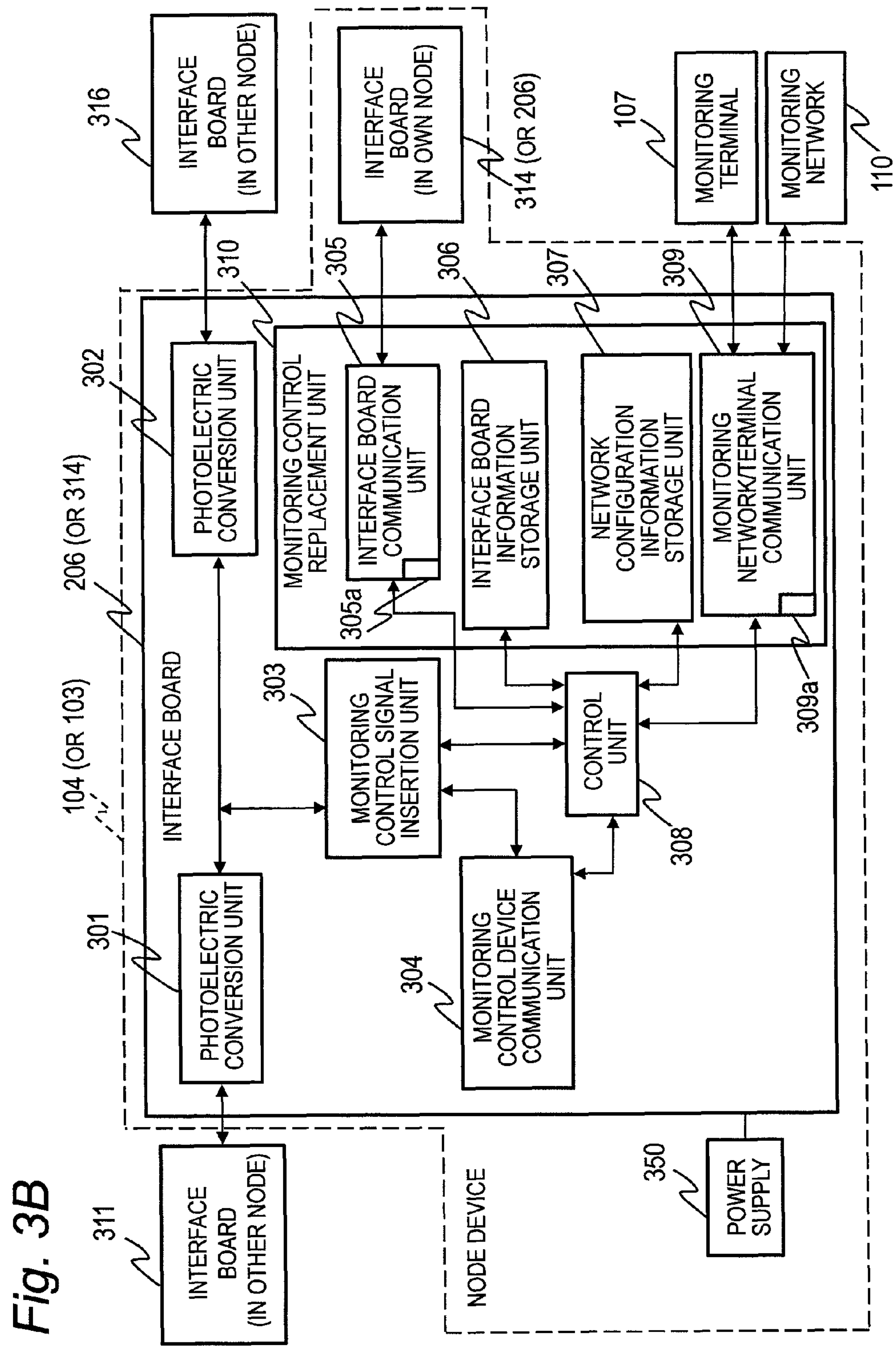
Fig. 3B
311
INTERFACE BOARD (IN OTHER NODE)
316
INTERFACE BOARD (IN OTHER NODE)
314 (OR 206)
INTERFACE BOARD (IN OWN NODE)
107
MONITORING TERMINAL
110
MONITORING NETWORK
104 (OR 103)
206 (OR 314)
INTERFACE BOARD
301
PHOTOELECTRIC CONVERSION UNIT
302
PHOTOELECTRIC CONVERSION UNIT
303
MONITORING CONTROL SIGNAL INSERTION UNIT
304
MONITORING CONTROL DEVICE COMMUNICATION UNIT
310
MONITORING CONTROL REPLACEMENT UNIT
305
INTERFACE BOARD COMMUNICATION UNIT
305a
306
INTERFACE BOARD INFORMATION STORAGE UNIT
307
NETWORK CONFIGURATION INFORMATION STORAGE UNIT
309
MONITORING NETWORK/TERMINAL COMMUNICATION UNIT
309a
308
CONTROL UNIT
NODE DEVICE
350
POWER SUPPLY

*Fig. 4*

INTERFACE BOARD INFORMATION STORAGE UNIT

| INTERFACE BOARD ID | OPERATING STATE INFORMATION |
|---|---|
| 00001 | OPERATION MODE |
| 00001 | WARNING INFORMATION 1 |
| 00001 | WARNING INFORMATION 2 |
| 00002 | OPERATION MODE |
| 00002 | WARNING INFORMATION 1 |
| 00002 | WARNING INFORMATION 2 |
| 00002 | WARNING INFORMATION 3 |
| | |

⋮

NETWORK CONFIGURATION INFORMATION STORAGE UNIT

| INTERFACE BOARD ID | NUMBER OF RELAY STAGES | FOR RELAYING |
|---|---|---|
| 00001 | 0 | × |
| 00002 | 0 | × |
| 00003 | 1 | × |
| 00004 | — | ○ |
| | | |

⋮

NODE DEVICE
INTERFACE BOARD
INTERFACE BOARD
INTERFACE BOARD
MONITORING CONTROL CENTER
4001
402
401
4002
4003
NODE DEVICE
INTERFACE BOARD
INTERFACE BOARD
INTERFACE BOARD
MONITORING CONTROL CENTER
403
404

NODE DEVICE
MONITORING CONTROL CENTER
INTERFACE BOARD
INTERFACE BOARD
INTERFACE BOARD
501
5001
504
503
502
5002
5005
5003
5006
5004
5007
NODE DEVICE
INTERFACE BOARD
507
NODE DEVICE
INTERFACE BOARD
505
NODE DEVICE
INTERFACE BOARD
506
NODE DEVICE
INTERFACE BOARD
508

OPTICAL COMMUNICATION SYSTEM, INTERFACE BOARD AND CONTROL METHOD PERFORMED IN INTERFACE BOARD

CLAIM OF PRIORITY

The present application claims priority from Japanese patent application JP2011-135347 filed on Jun. 17, 2011, the content of which is hereby incorporated by reference into this application.

BACKGROUND OF THE INVENTION

The present invention relates to an optical communication system, an interface board and an interface board control method.

A multitude of interface boards are installed in one node device since a plurality of signals can be transmitted by one optical fiber in a node device in an optical network utilizing wavelength division multiplexing (WDM). Normally, a monitoring control device is installed in a node device to monitor the occurrence of a fault in interface boards and change the setting of the interface boards. Since the monitoring control device of each node device is connected to a dedicated monitoring network, the monitoring control device of each node device can confirm information on a fault in the event of the fault.

However, if the node device with the monitoring control device having a fault is connected to the optical network, this node device is invisible to the monitoring network. Thus, the redundancy (duplication) of a monitoring control is necessary, which causes a problem of being uneconomical.

As for the redundancy of the monitoring control, an interface board disclosed in Japanese Unexamined Patent Application Publication No. JP2003-173265A constantly monitors a state of a monitoring control device and notifies the occurrence of a fault to a host system through a monitoring network in the event of a fault in the monitoring control device. The interface board notifies the occurrence of a fault to the host system and attempts a recovery by resetting a monitoring card.

SUMMARY OF THE INVENTION

However, in the conventional technology disclosed in JP2003-173265A, the monitoring control device and a plurality of interface boards simultaneously carry out monitoring to improve the reliability of a monitoring function, which is inefficient and increases power consumption.

An object of this invention is to reduce power consumption by efficiently monitoring interface boards.

An embodiment of the invention is an optical communication system including: a plurality of interface boards which transmit and receive optical signals to and from interface boards facing the plurality of interface boards; and a monitoring control device which monitors states of the plurality of interface boards. A first interface board of the plurality of interface boards includes: a replacement unit capable of monitoring the states of the plurality of interface boards on behalf of the monitoring control device and independently receiving supply of power; and a control unit configured to start the replacement unit in a case where a fault occurs in the monitoring control device and stop or halt the replacement unit in a case where there is no fault in the monitoring control device.

According to the aspect of this invention, the interface boards are efficiently monitored and power consumption is reduced.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF DRAWINGS

FIG. 3A is a block diagram showing an interface board of a node device in which a monitoring control device is installed, FIG. 3B is a block diagram showing an interface board of a node device in which no monitoring control device is installed, FIG. 4 is a table showing operating state information of the interface boards stored in an interface board information storage unit.

DETAILED DESCRIPTION OF THE PREFERRED EMBODIMENTS

Hereinafter, an embodiment of the present invention is described in detail with reference to the drawings.

Figure 1:
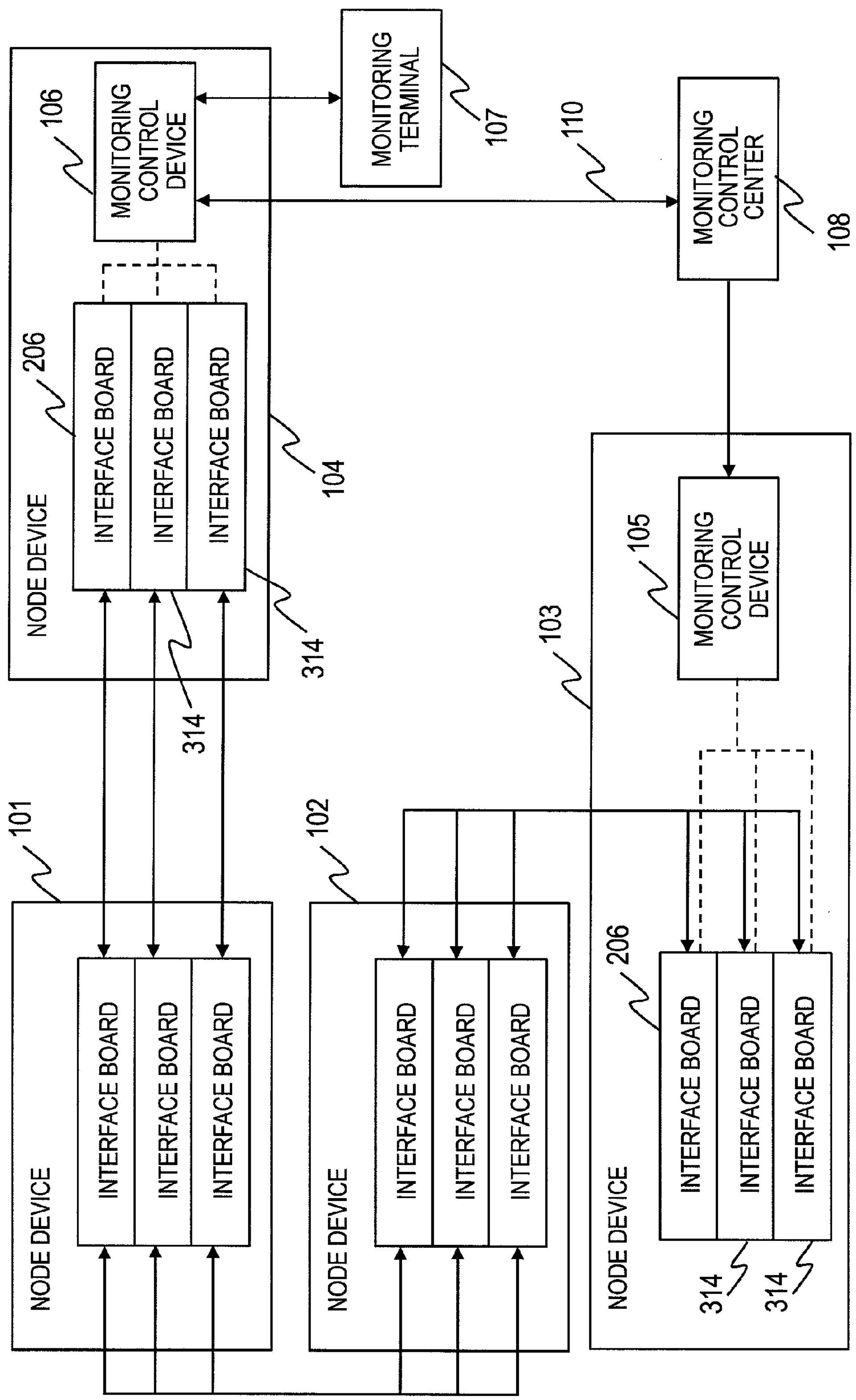
FIG. 1 is a schematic diagram showing an example of an optical network.

FIG. 1 is a diagram showing an example of an optical network in which the present invention is used. The optical network includes a plurality of node devices 101, 102, 103 and 104 connected by optical fibers.

A plurality of interface boards are installed in each of the node devices 101, 102, 103 and 104. The interface boards of a certain node device are connected to the interface boards of another node device by the optical fiber and transmit and receive signals (optical signals) to and from them. The interface boards installed in the same node device independently operate without transmitting and receiving signals to and from each other except when a fault occurs in a monitoring control device in that node device.

In FIG. 1, monitoring control devices are installed in the node devices 103, 104 out of the plurality of node devices and connected by an independent monitoring network 110. The monitoring control device 106 (or 105) installed in the node device 104 (or 103) is electrically connected to the interface boards installed in that node device 104 (or 103) via a bus and normally communicates with the interface boards in a one-to-one manner. A monitoring terminal 107 is connected to the monitoring control device 106 and a user can obtain information of the monitored optical network through the monitoring terminal 107. Note that the monitoring terminal 107 may be connected to the monitoring control device 105. Further, the monitoring control devices 105, 106 are connected to a monitoring control center 108 which accumulates information of the monitoring network 110.

Figure 2:
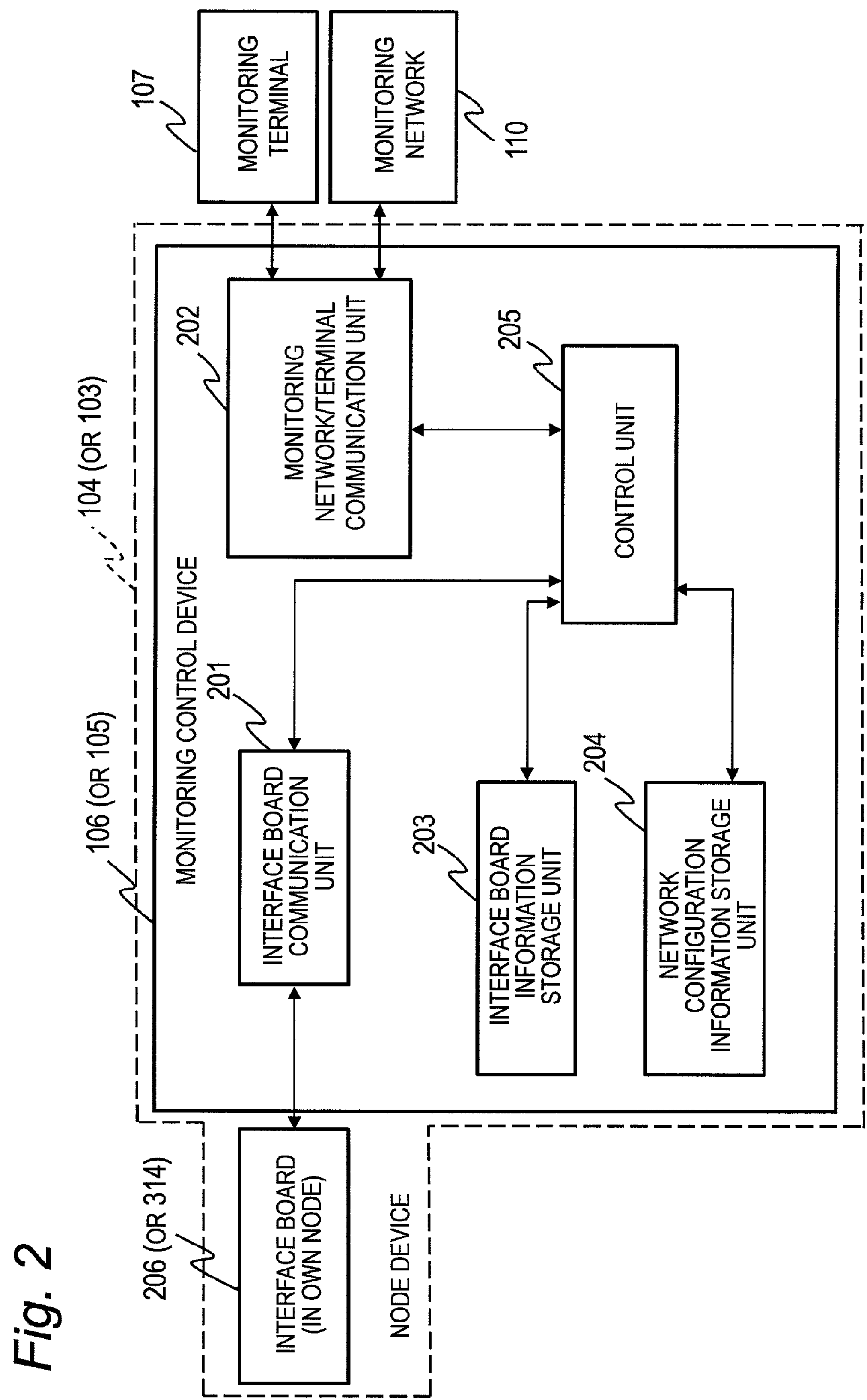
FIG. 2 is a block diagram showing a monitoring control device.

FIG. 2 is a block diagram showing the details of the monitoring control device. Note that the monitoring control device 105 has the same configuration as the monitoring control device 106 except that it is not connected to the monitoring terminal 107. Accordingly, the monitoring control device 106 installed in the node device 104 is mainly described below.

The monitoring control device 106 includes an interface board communication unit 201, a monitoring network/terminal communication unit 202, an interface board information storage unit 203, a network configuration information storage unit 204 and a control unit 205. These communication units 201, 202 are configured by an electrical circuit, and these storage units 203, 204 are configured by a memory such as a DRAM (Dynamic Random Access Memory) or a memory area of a memory. For example, the control unit 205 is configured by a microcomputer including a CPU (Central Processing Unit) and a memory or an arithmetic processing circuit such as an FPGA or an ASIC.

The interface board communication unit 201 of the monitoring control device 106 electrically communicates with the interface board 206 of the own node device 104, in which the monitoring control device 106 is provided, via the bus. The monitoring network/terminal communication unit 202 transmits information stored in the interface board information storage unit 203 and the network configuration information storage unit 204 to the monitoring network 110 or the monitoring terminal 107 via the control unit 205. Further, the monitoring network/terminal communication unit 202 receives information on the interface boards of the other node device 103 from the monitoring control device 105 of the other node device 103.

The control unit 205 regularly transmits an operating state request signal requesting a notification on an operating state to each interface board 206, 314 of the own node device 104 in which the monitoring control device 106 is installed. In this way, the control unit 205 regularly obtains the operating state information from each interface board 206, 314 of the own node device 104 via the interface board communication unit 201 and stores it in the interface board information storage unit 203. Here, the operating state information is information on the operating states of the interface boards such as warning information. Further, the control unit 205 obtains operating state information of the interface boards of the node device 101 facing the own node device 104 (adjacently connected node device 101) or the like via the interface board communication unit 201 and each interface board 206, 314 of the own node device 104 and stores it in the interface board information storage unit 203 if necessary.

Further, the control unit 205 obtains information on the configuration of the optical network (network configuration information) via each interface board 206, 314 by the interface board communication unit 201 of the own node device 104 and stores it in the network configuration information storage unit 204. The network configuration information includes ID numbers (identification numbers) of the interface boards received from the interface boards installed in the other node devices and information on the numbers of relay stages from the own node device 104. The monitoring network/terminal communication unit 202 transmits information in the network configuration information storage unit 204 and the interface board information storage unit 203 to the monitoring terminal 107.

FIG. 3A is a block diagram showing the details of each interface board provided in the node device 104 (or 103) in which the monitoring control device is installed. Although the configuration of one arbitrary interface board 206 in the node device 104 is described here, the other interface boards in the node device 104 also have the same configuration.

The interface board 206 includes photoelectric conversion units 301, 302, a monitoring control signal insertion unit 303, a monitoring control device communication unit 304, a control unit 308 and a monitoring control replacement unit 310. The photoelectric conversion units 301, 302, the monitoring control signal insertion unit 303 and the monitoring control device communication unit 304 are configured by an electrical circuit. For example, the control unit 308 is configured by an arithmetic processing circuit such as an FPGA or an ASIC or a microcomputer including a CPU (Central Processing Unit) and a memory.

The photoelectric conversion unit 301 of the interface board 206 is connected to an interface board 311 of the facing node device (other node device) via an optical fiber. The photoelectric conversion unit 302 is connected to a client device 313. The photoelectric conversion unit 302 may be connected to the interface board of the other node device. The photoelectric conversion units 301, 302 convert an optical signal into an electrical signal for processing in the interface board 206.

The monitoring control signal insertion unit 303 inserts a signal for monitoring control (also called a monitoring control signal) sent from the control unit 308 into a free space of a header part of a main signal out of the electrical signal from the photoelectric conversion unit 301, 302. Here, the main signal is a data signal of a user. The monitoring control signal includes operating state information of the interface board, network configuration information and various request signals. The operating state information of the interface board includes warning information (warning signal) of the interface board, an operation mode of the interface board and the ID number of the interface board. The request signals include a request signal for network configuration investigation (network configuration investigation request signal).

The monitoring control device communication unit 304 receives a request for a notification on the operating state (operating state request) from the monitoring control device 106 and transmits the operating state information received from the interface board 206 and the interface board 311 facing the interface board 206 to the monitoring control device 106. Here, an interface board that faces a first interface board (facing interface board) is an interface board connected to the first interface board of a first node device via an optical fiber and installed in a node different from the first node device.

The monitoring control replacement unit 310 can execute the monitoring control on behalf of the monitoring control device 106, monitor the operating states of the interface boards on behalf of the monitoring control device 106 and independently receive supply of power from another part. The monitoring control replacement unit 310 includes an interface board communication unit 305, an interface board information storage unit 306, a network configuration information storage unit 307 and a monitoring network/terminal communication unit 309. These communication units 305, 309 are configured by an electrical circuit, and these storage units 306, 307 are configured by a memory such as a DRAM (Dynamic Random Access Memory) or a memory area of a memory.

The interface board communication unit 305 includes a switch 305*a* which enables or disables (turns on or off) the supply of power from a power supply 350 to the interface board communication unit 305. The monitoring network/terminal communication unit 309 includes a switch 309*a* which enables or disables (turns on or off) the supply of power from the power supply 350 to the monitoring network/terminal communication unit 309. The control unit 308 can send command signals to turn on or off the switches 305*a* and 309*a* respectively to the interface board communication unit 305 and the monitoring network/terminal communication unit 309. Note that these switches 305*a*, 309*a* may be provided as parts of the control unit 308.

The monitoring control replacement unit 310 is normally in a stopped state, but starts by having power supplied thereto (being energized) when a fault occurs in the monitoring control device 106. The monitoring control replacement unit 310 starts when power is supplied to the interface board communication unit 305 and the monitoring network/terminal communication unit 309. Power is supplied to the interface board communication unit 305 and the monitoring network/terminal communication unit 309 respectively via the switches 305*a*, 309*a* in response to a command from the control unit 308 only when a fault occurs in the monitoring control device 106.

The interface board communication unit 305 electrically communicates via the bus with the other interface boards 314 in the own node device in which the interface board 206 is present. Note that the monitoring control replacement unit 310 is started only in one interface board in one node device and the interface boards communicate in a one-to-one manner in that node device. Thus, all the interface boards share one line in one node device.

The interface board information storage unit 306 stores the operating state information of each interface board 206, 314 in the own node device in which the interface board 206 is present. Further, the interface board information storage unit 306 may store operating state information included in a main signal (data signal) from the facing interface board belonging to the node device other than the own node device. The control unit 308 obtains the operating state information from the other interface boards 314 in the own node device via the interface board communication unit 305 and sends it to the interface board information storage unit 306.

The network configuration information storage unit 307 stores the ID number (identification number) of the interface board 311 installed in the node device (other node device) other than the own node device 104 (or 103) and information on the number of relay stages from the own node device as network configuration information. Further, the network configuration information storage unit 307 can receive the network configuration information included in the main signal via the optical fiber, the photoelectric conversion unit 301 and the control unit 308.

The control unit 308 operates as follows in the event of a fault in the monitoring control device 106. The control unit 308 generates an operating state request signal for the interface boards 314 other than the interface board 206 in the own node device and sends it to the other interface boards 314 via the interface board communication unit 305. Further, the control unit 308 generates a network configuration investigation request signal for the interface board 311 of the node device other than the own node device, sends it to the interface board 311 and obtains the network configuration on the interface board 311 and the like. Further, the control unit 308 generates a network configuration investigation request signal, sends it to the interface boards 314 of the own node device and obtains the network configuration on the interface boards of the other node device connected to the interface boards 314. Note that the control unit 308 transfers the network configuration investigation request signal transmitted from the monitoring control device 106 to the interface board 311 of the other node device in the normal stage of the monitoring control device 106.

The monitoring network/terminal communication unit 309 transmits the operating state information of the interface boards stored in the interface board information storage unit 306 to the monitoring network and receives the operating state information of the interface boards from the monitoring control device of the other node device. The monitoring network/terminal communication unit 309 transmits the network configuration information stored in the network configuration information storage unit 307 to the monitoring network 110 or the monitoring terminal 107 and receives the network configuration information from the monitoring control device of the other node device.

FIG. 3B is a block diagram showing the details of the interface board provided in the node device in which the monitoring control device is not installed (e.g. node device 101 or 102 for relay of FIG. 1). In FIG. 3B, a monitoring control device communication unit 304 may not be connected to the monitoring control device or may be omitted unlike in FIG. 3A. Further, in the case of the node device 101 or 102 for relay, a photoelectric conversion unit 302 may be connected to an interface board 316 of the other node device, and a monitoring network/terminal communication unit 309 may be connected to neither the monitoring terminal 107 nor the monitoring network 110 or may be omitted. In this case, the operating state information of the interface boards stored in an interface board information storage unit 306 may be inserted as a part of a monitoring control signal into a main signal and transmitted to an optical transmission path via a control unit 308 and a monitoring control signal insertion unit 303. The other configuration of the interface board of FIG. 3B is the same as that of FIG. 3A.

In the node device in which the monitoring control device is not installed, the monitoring control replacement unit 310 may be constantly in operation. In this way, even in a small-size node device in which a monitoring control device cannot be installed due to a limited installation space, the same monitoring control function as the monitoring control device can be constantly fulfilled by providing the monitoring control replacement unit 310. In this case, all the node devices can have a function of monitoring the interface boards regardless of the size and perfect monitoring can be carried out in the entire optical network.

FIG. 4 is a table showing the operating state information of the interface boards stored in the interface board information storage unit 306 (or 203).

The interface board information storage unit 306 (or 203) stores the operating state information in correspondence with the obtained ID numbers of the interface boards. The operating state information includes an operation mode and warning information. For example, the operation mode indicates a relay mode in which the interface board relays an optical signal, a non-relay mode in which an optical signal is not relayed and a communication speed. For example, the warning information indicates that the interface board is not receiving an optical signal and that the photoelectric conversion unit 301 (or 302) is at fault.

Figures 5, 6:
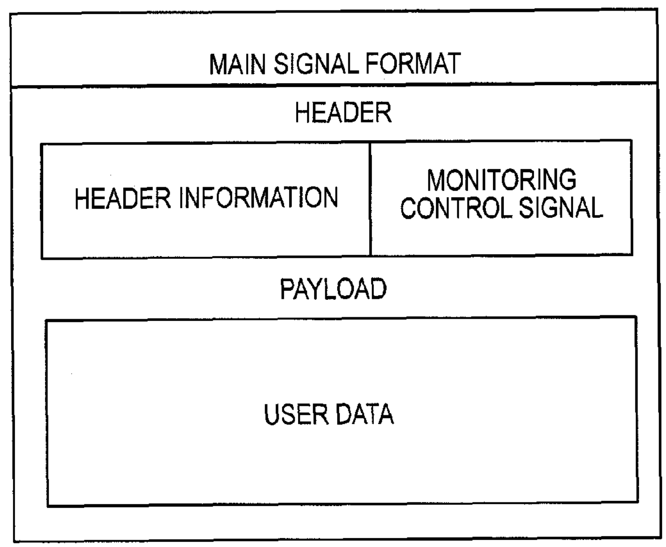
FIG. 5 is a table showing network configuration information stored in a network configuration information storage unit.
FIG. 6 is a diagram showing a signal format of a main signal.

FIG. 5 is a table showing the network configuration information stored in the network configuration information storage unit 307 (or 204). The network configuration information includes combinations of the ID numbers and the numbers of relay stages of the interface boards on the network. The number of relay stages is the number of the interface boards through which a network configuration investigation request signal is routed from the node device as a transmission source to that interface board.

FIG. 6 is a diagram showing a signal format of a main signal which is a data signal of a user. In this embodiment, the signal format is based on the OTN (Optical Transport Network) standard. The main signal is composed of a header part and a payload, and the user's data is stored in the payload. In the header part provided based on the OTN standard, there is an area usable by the user (user usable area). The monitoring control signal described above may be embedded in the user usable area of the header part. This enables the monitoring control signal to be transmitted and received between the interface boards for the main signal connected to each other without compressing the area of the payload of the main signal. Besides, the header part may include the address of the interface board or the node device as a transfer destination of the main signal (data).

Figure 7A:
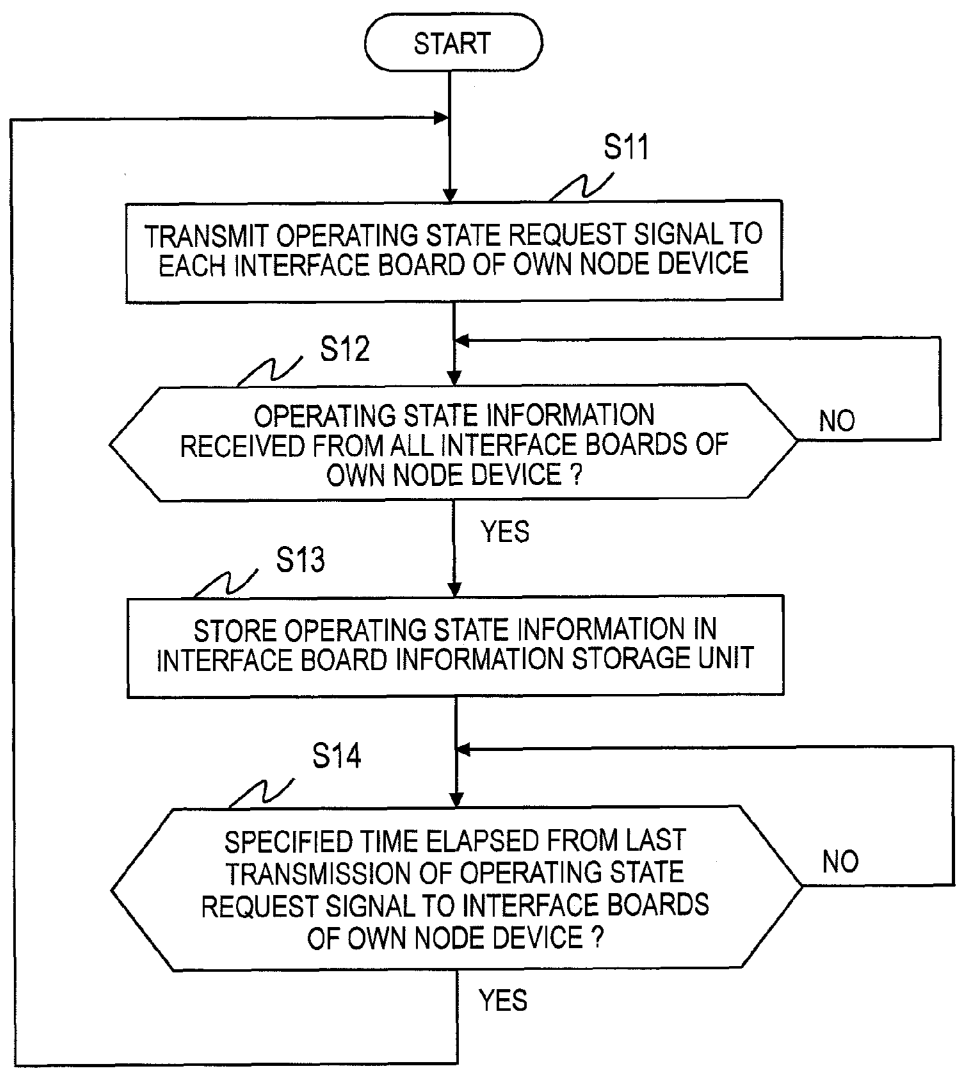
FIG. 7A is a flow chart showing a monitoring control.

FIG. 7A is a flow chart showing a monitoring control to monitor the interface boards. The control unit 205 of the monitoring control device 106 or the control unit 308 of the interface board including the monitoring control replacement unit 310 executes the monitoring control. The routine of this monitoring control is regularly executed, and the operating state information is obtained from each interface board and data of the interface board information storage unit 203 (or 306) is updated.

In Step S11, the control unit 205 (or 308) transmits an operating state request signal to each interface board 206, 314 of the own node device. The control unit 205 of the monitoring control device transmits the operating state request signal via the interface board communication unit 201. The control unit 308 of the interface board transmits the operating state request signal to the photoelectric conversion units 301, 302 in the own interface board 206 and transmits the operating state request signal to the other interface board 314 via the interface board communication unit 305. Note that if a plurality of interface boards are installed in the own node device, the operating state request signals are transmitted to the respective interface boards with a time lag so that the operating state request signals are not simultaneously transmitted to the plurality of interface boards.

In Step S12, the control unit 205 (or 308) determines whether or not the operating state information has been received from all the interface boards 206, 314 of the own node device. The routine proceeds to Step S13 if the reception has been completed, whereas the control unit 205 (or 308) waits by repeating judgment of Step S12 unless the reception has been finished.

In Step S13, the control unit 205 (or 308) sends the operating state information including the ID number, the operation mode and the warning information of each interface board to the interface board information storage unit 203 (or 306). The interface board information storage unit 203 (or 306) stores the operating state information. In Step S14, the control unit 205 (or 308) determines whether or not a specified period (e.g. several hundreds of milliseconds) has elapsed after the last transmission of the operating state request signal to the interface board. If the specified period has elapsed, the routine returns to Step S11. Unless the specified period has elapsed, judgment of Step S14 is repeated and the control unit 205 waits until the specified period elapses.

Figure 7B:
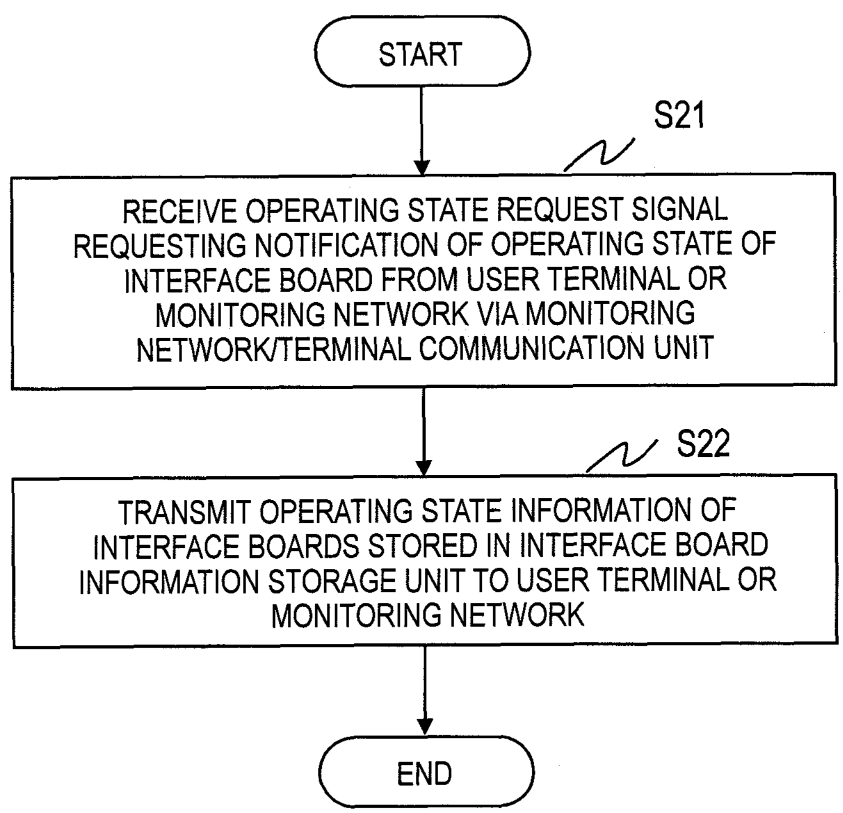
FIG. 7B is a flow chart showing a communication control in a monitoring network.

FIG. 7B is a flow chart showing a communication control in the monitoring network. The control unit 205 of the monitoring control device 106 (or 105) or the control unit 308 of the interface board executes this communication control.

In Step S21, the control unit 205 (or 308) receives the operating state request signal requesting a notification on the operating states of the interface boards from the monitoring terminal 107 or the monitoring network 110 via the monitoring network/terminal communication unit 202 (or 309). In Step S22, the control unit 205 (or 308) transmits the operating state information of the interface boards stored in the interface board information storage unit 203 (or 306) to the monitoring terminal 107 or the monitoring network 110.

Figure 7C:
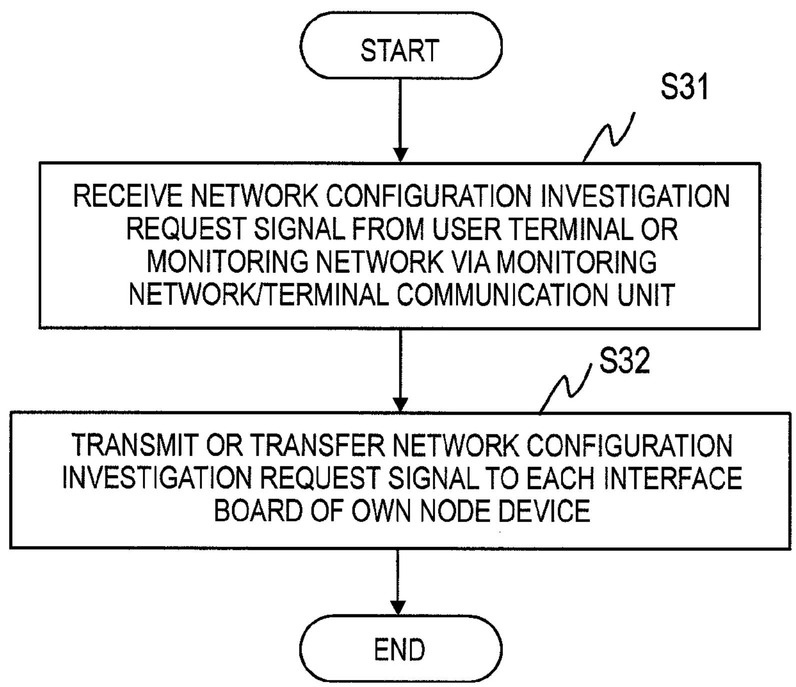
FIG. 7C is a flow chart showing a transfer control of a network configuration investigation request signal.

FIG. 7C is a flow chart showing a transfer control of the network configuration investigation request signal. The control unit 205 of the monitoring control device 106 (or 105) or the control unit 308 of the interface board of the node device in which the monitoring control device 106 (or 105) is provided executes the transfer control.

In Step S31, the control unit 205 (or 308) receives the network configuration investigation request signal from the monitoring terminal 107 or the monitoring network 110 via the monitoring network/terminal communication unit 202 (or 309). In Step S32, the control unit 205 (or 308) transmits or transfers the network configuration investigation request signal to each interface board of the own node device. Note that the control unit 308 of the interface board having received this network configuration investigation request signal causes the monitoring control signal insertion unit 303 to add the ID number of the own interface board for the identification of the transmission source to the network configuration investigation request signal and transfers the network configuration investigation request signal to the facing interface board 311 present in the other node device.

Figure 7D:
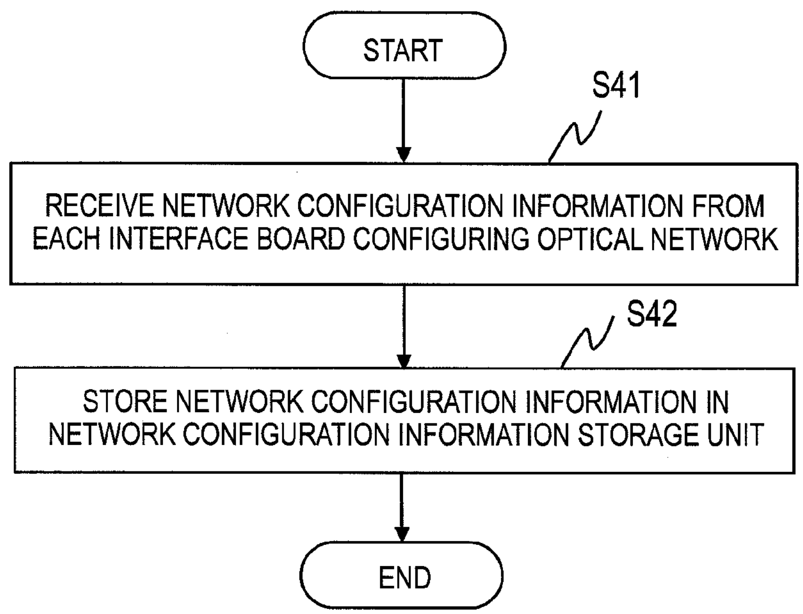
FIG. 7D is a flow chart showing a reception control of the network configuration investigation request signal.

FIG. 7D is a flow chart showing a reception control of the network configuration investigation request signal. The control unit 205 of the monitoring control device 106 (or 105) or the control unit 308 of the interface board executes the reception control.

In Step S41, the control unit 205 (or 308) receives the network configuration information including the ID number and the number of relay stages of the interface board from each interface board configuring the optical network. The number of relay stages is the number of the interface boards from the node device that has transmitted the network configuration investigation request signal. In Step S42, the control unit 205 (or 308) stores the network configuration information in the network configuration information storage unit 204 and transmits it to the monitoring terminal 107 or the monitoring network 110.

Figure 8A:
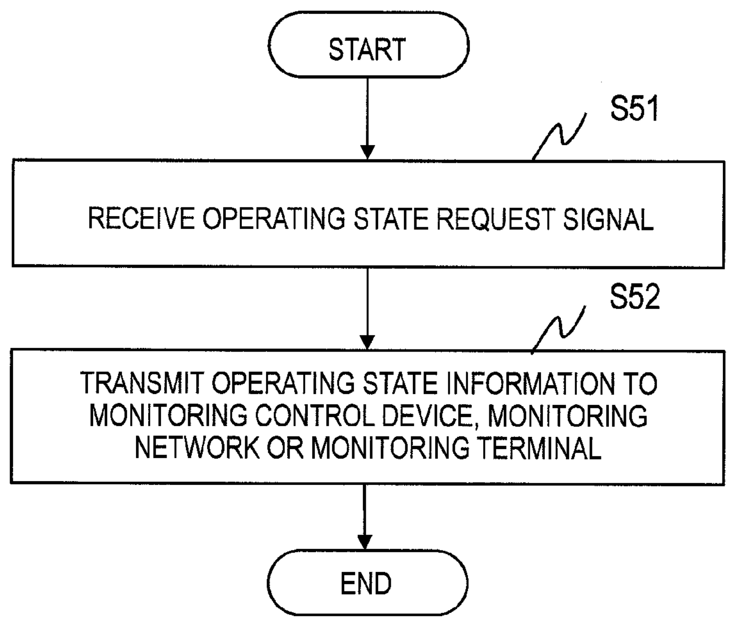
FIG. 8A is a flow chart showing a transmission control of the operating state information from the interface board.
Figure 8B:
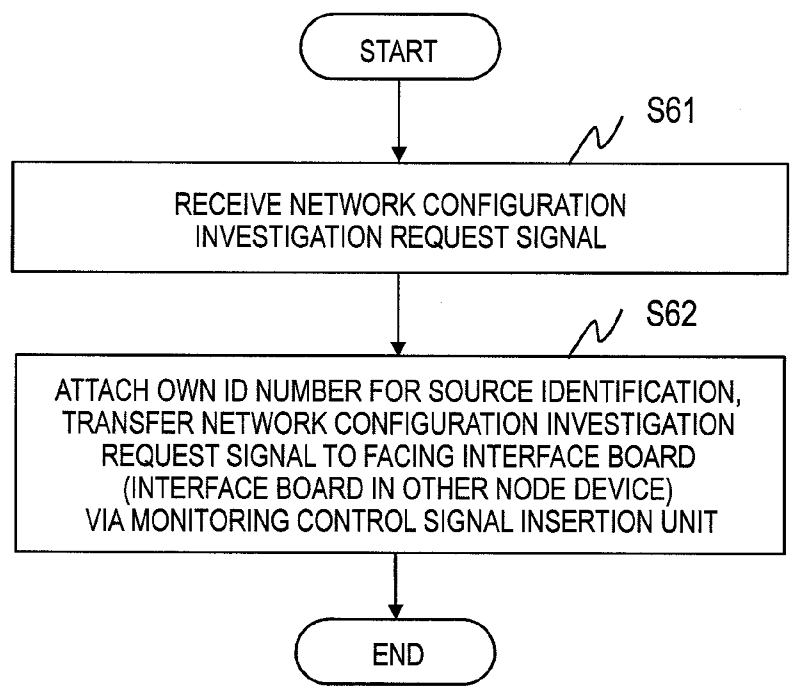
FIG. 8B is a flow chart showing a transfer control of transferring the network configuration investigation request signal from the interface board.

FIG. 8A is a flow chart showing a transmission control of the operating state information from the interface board to the monitoring control device 106, the monitoring network 110 or the like. The control unit 308 of the interface board 206 (or 314) executes this transmission control.

In Step S51, the control unit 308 of the interface board, in normal times, receives the operating state request signal from the monitoring control device 106 via the monitoring control device communication unit 304. The control unit 308 receives the operating state request signal from the monitoring network 110 or the monitoring terminal 107 via the monitoring network/terminal communication unit 309 in the event of a fault in the monitoring control device 106.

In Step S52, the control unit 308 of the interface board, in normal times, transmits the ID number of the own interface board and the operating state information obtained from the photoelectric conversion units 301, 302 to the monitoring control device 106 via the monitoring control device communication unit 304. The operating state information of the interface board includes information such as the operation mode and the warning information. In the event of a fault in the monitoring control device 106, the control unit 308 of the interface board transmits the ID number and the operating state information of each interface board in the own node device stored in the interface board information storage unit 306 to the monitoring network 110 or the monitoring terminal 107 via the monitoring network/terminal communication unit 309. If the main signal includes the ID number and the operating state information of the facing interface board (interface board 311 of the other node device), the control unit 308 of the interface board can also transmit these ID number and operating state information.

FIG. 8 is a flow chart showing a transfer control of transferring the network configuration investigation request signal to the facing interface board. The control unit 308 of the interface board executes this transfer control.

In Step S61, the control unit 308 of the interface board receives the network configuration investigation request signal. The network configuration investigation request signal is transmitted from the monitoring control device 106 in normal times and transmitted from the monitoring network 110 or the monitoring terminal 107 via the monitoring network/terminal communication unit 309 in the event of a fault in the monitoring control device 106. The control unit 308 may receive the network configuration investigation request signal transferred from the other interface board in the own node device in the event of a fault in the monitoring control device 106.

In Step S62, the control unit 308 of the interface board adds the ID number of the own interface board for the identification of the transmission source and transfers the network configuration investigation request signal to the facing interface board 311 (interface board of the other node device) via the monitoring control signal insertion unit 303. The network configuration investigation request signal is included in the monitoring control signal of the main signal and transferred via the optical fiber transmission path.

Figure 8C:
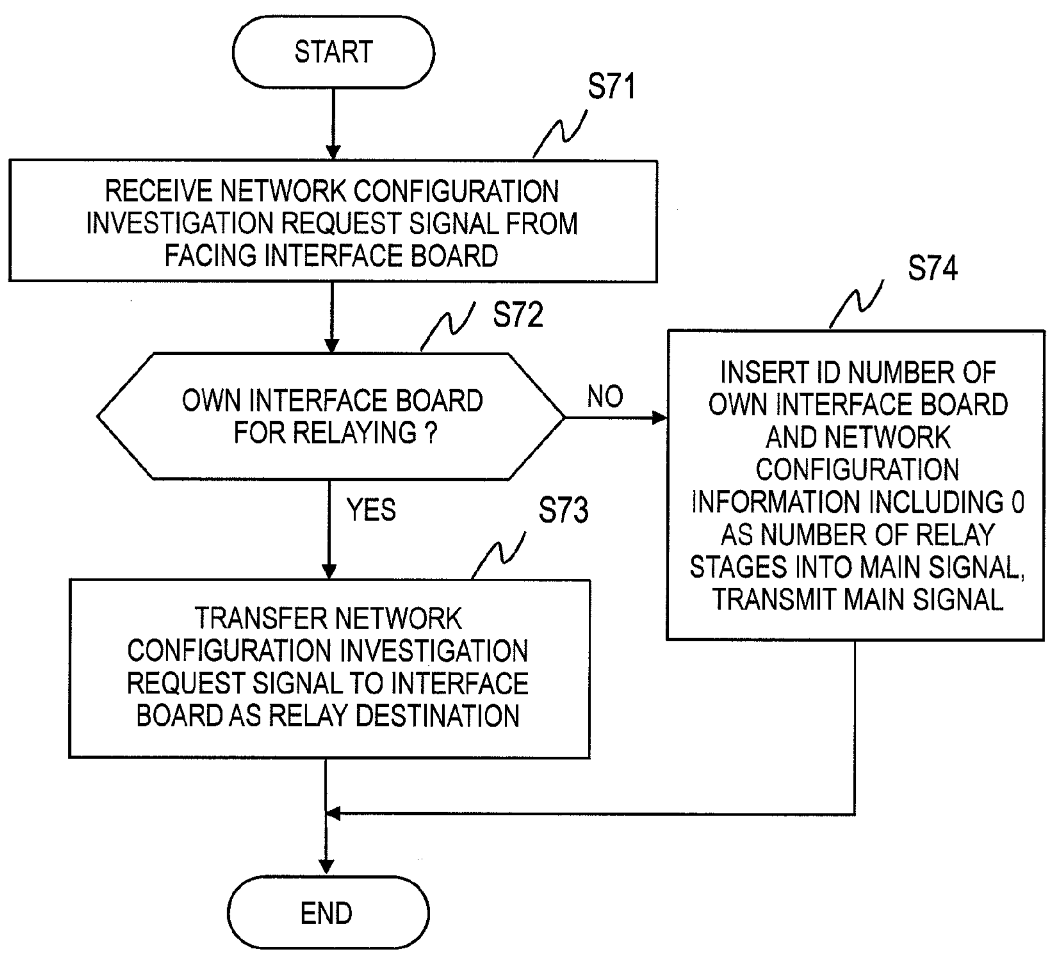
FIG. 8C is a flow chart showing a transfer control of the network configuration investigation request signal performed by a facing interface board.

FIG. 8C is a flow chart showing a transfer control of the network configuration investigation request signal performed by the facing interface board. The control unit 308 of the interface board executes this transfer control.

In Step S71, the control unit 308 (e.g. FIG. 3B) of the interface board receives the network configuration investigation request signal from the facing interface board 316 (or 311). In Step S72, it is determined whether or not the own interface board is for relay. If the own interface board is a relay interface board, the routine proceeds to Step S73. In Step S73, the control unit 308 transfers the network configuration investigation request signal to the interface board as a relay destination. If the own interface board is not for relay, the routine proceeds to Step S74. In Step S74, the control unit 308 transmits a network configuration information signal including the ID number of the own interface board and 0 as the number of relay stages from the node device having transmitted to the network configuration investigation request signal by inserting it into the main signal.

Figure 8D:
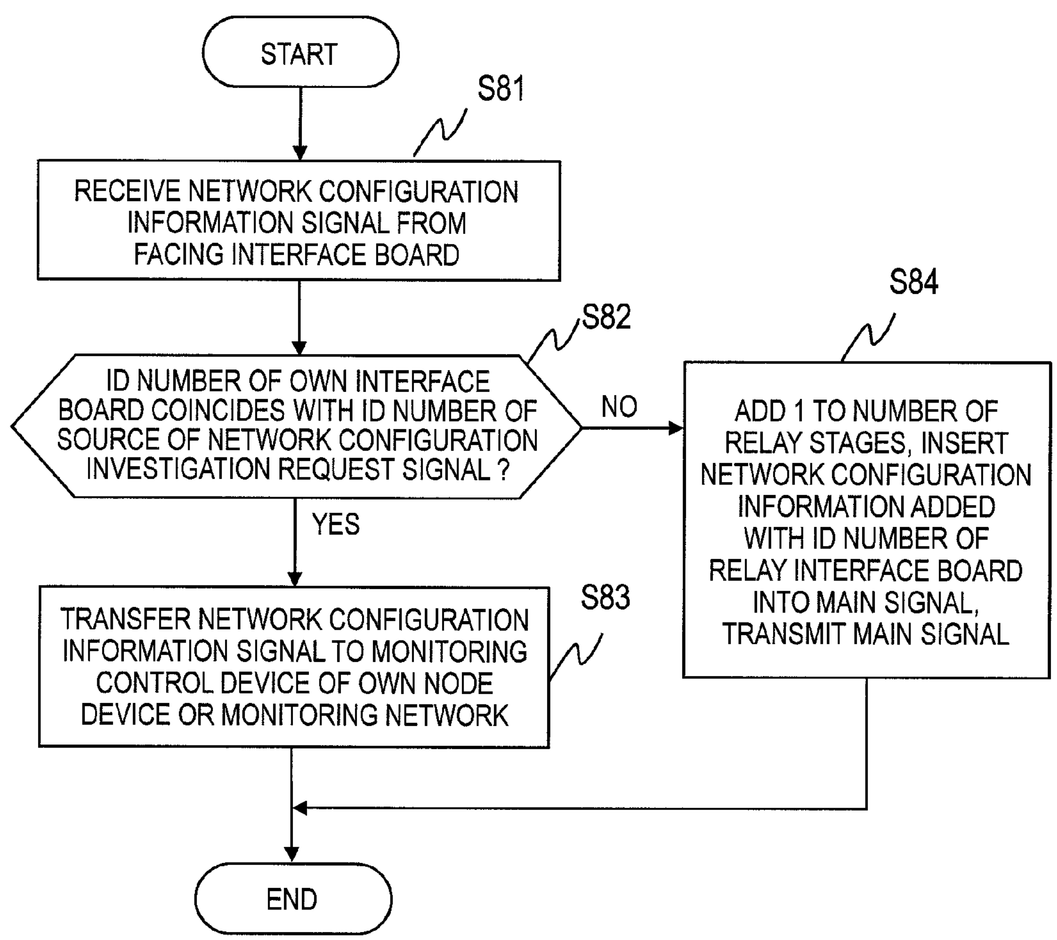
FIG. 8D is a flow chart showing a transfer control of transferring a network configuration information signal from the interface board.

FIG. 8D is a flow chart showing a transfer control of the network configuration information signal. The control unit 308 of the interface board executes this transfer control.

In Step S81, the control unit 308 of the interface board receives the network configuration information signal from the facing interface board 311. In Step S82, it is determined whether or not the ID number of the own interface board coincides with the ID number of the transmission source of the network configuration investigation request signal.

If the ID number of the own interface board coincides with the ID number of the transmission source, the received network configuration information signal is a response to the network configuration investigation request signal transmitted by the own interface board and the routine proceeds to Step S83. In Step S83, the control unit 308 transfers the network configuration information signal to the monitoring control device 106 of the own node device. The control unit 308 transfers the network configuration information signal to the monitoring network 110 or the monitoring terminal 107 via the monitoring network/terminal communication unit 309 in the event of a fault in the monitoring control device 106.

Unless the ID number of the own interface board coincides with the ID number of the transmission source, the received network configuration information signal is a response to the network configuration investigation request signal transmitted by the other interface board and the routine proceeds to Step S84. In Step S84, the control unit 308 transmits a corrected network configuration information signal to the interface board in the other node device by including it in the main signal on the optical fiber transmission path. Here, the control unit 308 adds 1 to the number of relay stages from the node device having transmitted the network configuration investigation request signal in the network configuration information signal and corrects the network configuration information signal by adding its own ID number as the information of the interface board that has relayed.

Figure 9A:
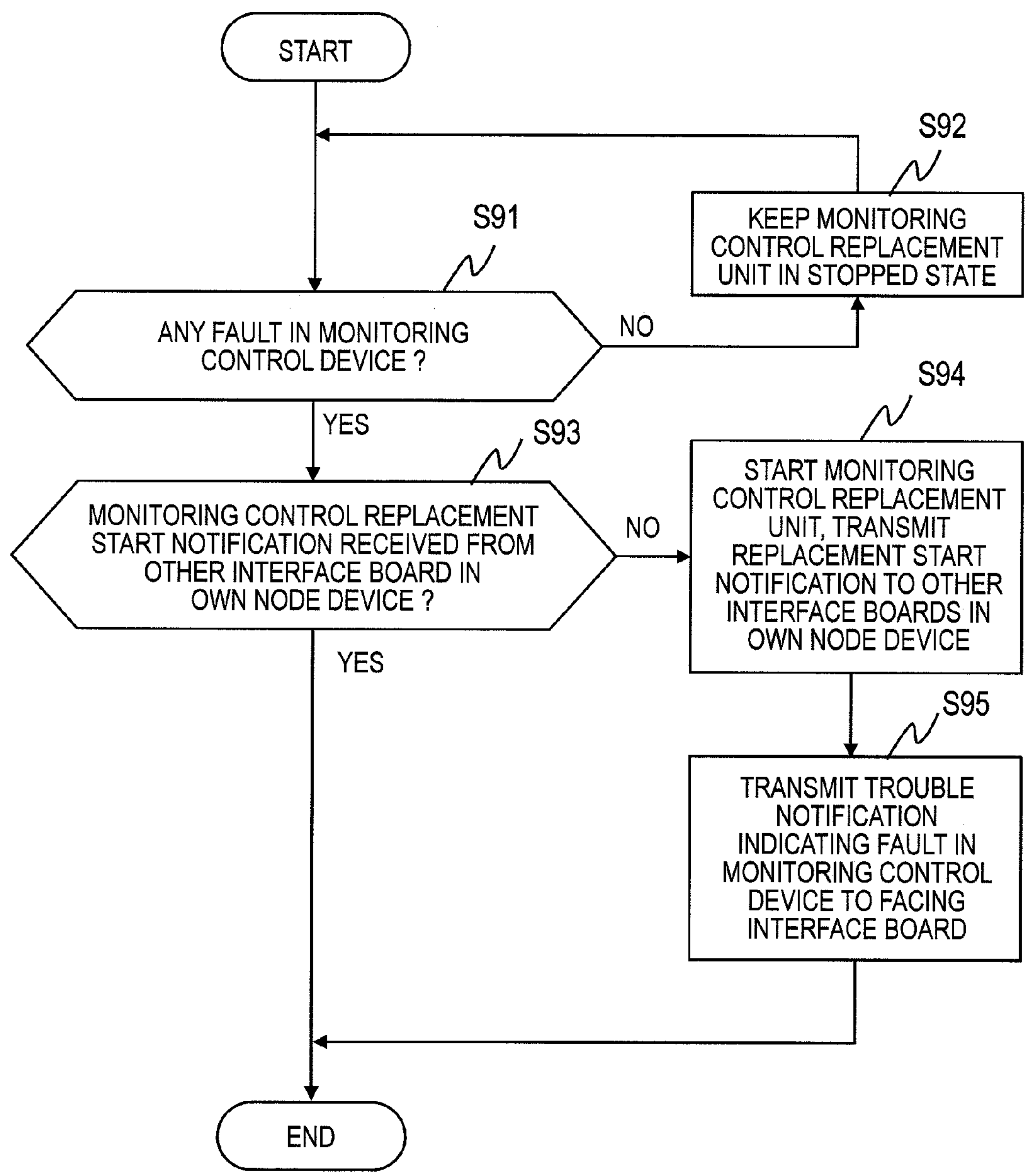
FIG. 9A is a flow chart showing a fault monitoring control in which the interface board monitors a fault in the monitoring control device.

FIG. 9A is a flow chart showing a fault monitoring control in which the interface board (FIG. 3A) monitors a fault in the monitoring control device. The control unit 308 of the interface board (FIG. 3A) repeatedly executes this fault monitoring control.

In Step S91, the control unit 308 of the interface board determines whether or not any fault has occurred in the monitoring control device 106. The control unit 308 of the interface board determines the occurrence of a fault in the monitoring control device 106 when receiving no operating state request signal from the monitoring control device 106 for a predetermined period (e.g. three or four times as long as the above specified period) or longer. The control unit 308 may determine the occurrence of a fault if the signal from the monitoring control device 106 cannot be read since an error is included. If there is no fault in the monitoring control device 106, the control unit 308 keeps the monitoring control replacement unit 310 in a stopped state (state where no power is supplied) in Step S92. Further, the routine waits by repeating a processing of Step S91. When the monitoring control device 106 recovers from a fault, the control unit 308 cuts off power via a switch and stops the monitoring control replacement unit 310 in Step S92. On the other hand, the routine proceeds to Step S93 if a fault has occurred in the monitoring control device 106.

In Step S93, the control unit 308 of the interface board determines whether or not a replacement start notification indicating the execution of the monitoring control on behalf of the monitoring control device 106 has been received from the other interface board 314 of the own node device. Since the other interface board 314 executes the monitoring control on behalf of the monitoring control device 106 if the replacement start notification has been received, the control unit 308 finishes the process and keeps the monitoring control replacement unit 310 in the stopped state. Unless the replacement start notification has been received, the routine proceeds to Step S94.

In Step S94, the control unit 308 starts the monitoring control replacement unit 310 and executes the monitoring control on behalf of the monitoring control device 106. The monitoring control replacement unit 310 starts by having power supplied thereto in response to a command of the control unit 308. Further, the control unit 308 transmits the replacement start notification to the other interface boards 314 in the own node device. Even if judging the occurrence of a fault in the monitoring control device 106, the interface board 314 having received the replacement start notification does not start the monitoring control replacement unit 310. This causes only one interface board to start the monitoring control replacement unit 310 in one node device. That one interface board is automatically selected without any command from the outside of the node device including it.

After the monitoring control replacement unit 310 starts, the control unit 308 of the interface board transmits trouble notification of the monitoring control device to the facing interface board 311 by including it in the header part of the main signal in Step S95. The trouble notification indicates the occurrence of a fault in the monitoring control device.

Figure 9B:
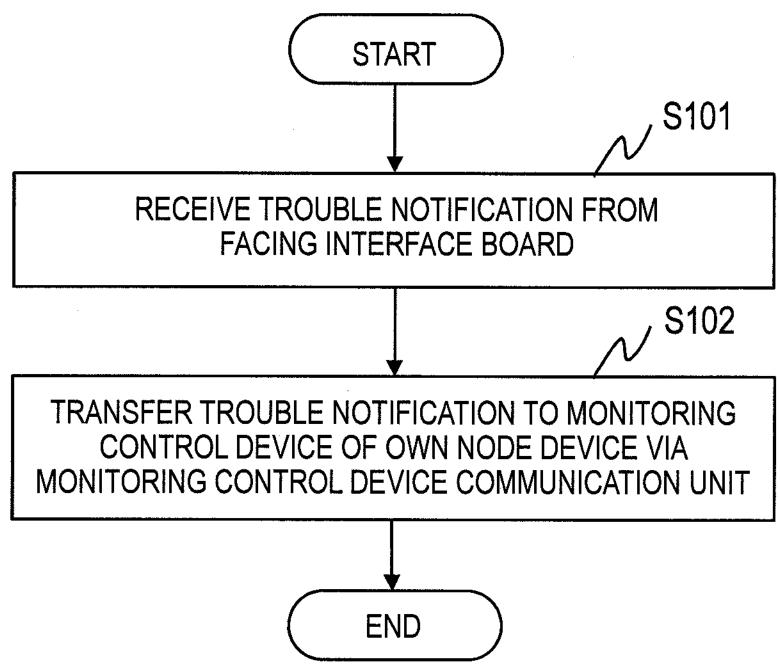
FIG. 9B is a flow chart showing a transfer control in which the interface board transfers trouble notification.

FIG. 9B is a flow chart showing a transfer control in which the interface board transfers the trouble notification. The control unit 308 of the interface board executes this transfer control of the trouble notification.

In Step S101, the control unit 308 of the interface board receives the trouble notification indicating the occurrence of a fault in the monitoring control device 106 from the facing interface board. In Step S102, the interface board of the node device including the monitoring control device (e.g. 105) transfers the trouble notification to the monitoring control device (e.g. 105) of the own node device via the monitoring control device communication unit 304. The monitoring control device notifies a trouble to the user via the monitoring network 110. The interface board of the node device (e.g. 101, 102) not including the monitoring control device further transfers the trouble notification to the facing interface board.

Figure 10:
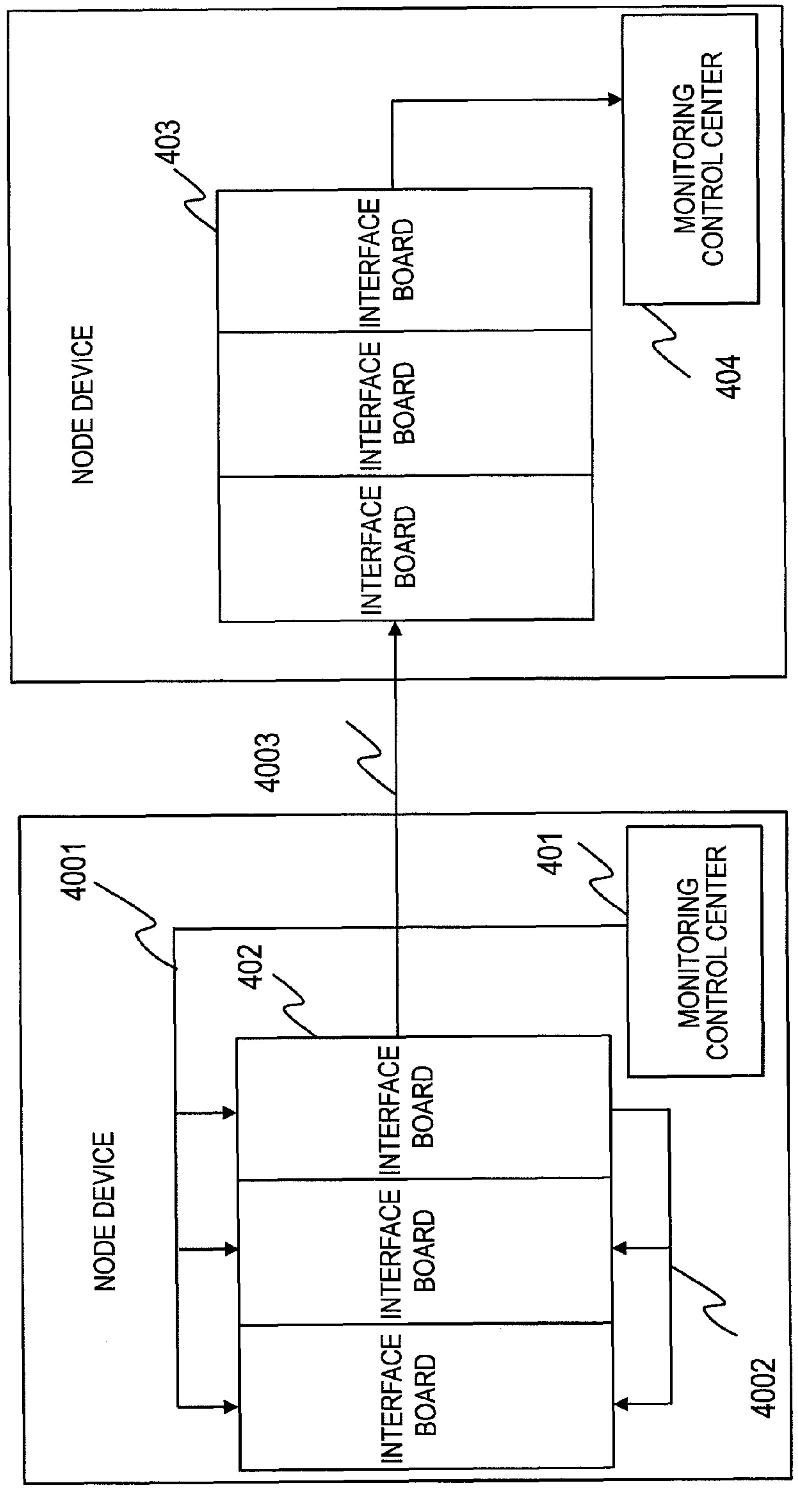
FIG. 10 is a diagram illustrating a control operation when a fault occurs in the monitoring control device.

FIG. 10 is a diagram illustrating a control operation when a fault occurs in the monitoring control device.

The monitoring control device that is operating normally is regularly transmitting an operating state request signal 4001 at a different timing to each interface board installed in the own node device (S11 of FIG. 7A). Each interface board detects a fault of the monitoring control device (S91 of FIG. 9A) if the operating state request signal 4001 of the interface board has not been received for a predetermined period. Thus, one interface board 402 determined by an occurring timing of a fault in the monitoring control device 401 detects a fault in the monitoring control device.

The interface board 402 having detected the fault starts and activates its monitoring control replacement unit 310 and transfers a replacement start notification 4002 of the monitoring control to the other interface boards in the same node device (S94 of FIG. 9A). Further, the interface board 402 transmits a monitoring control device trouble notification 4003 to an interface board 403 of a facing node device (S95 of FIG. 9A). The interface board 403 having received the trouble notification 4003 transfers the monitoring control device trouble notification 4003 to a monitoring control device 404 in the same node device (S102 of FIG. 9B). The monitoring control device 404 notifies a trouble to the user via the monitoring network 110.

Figure 11:
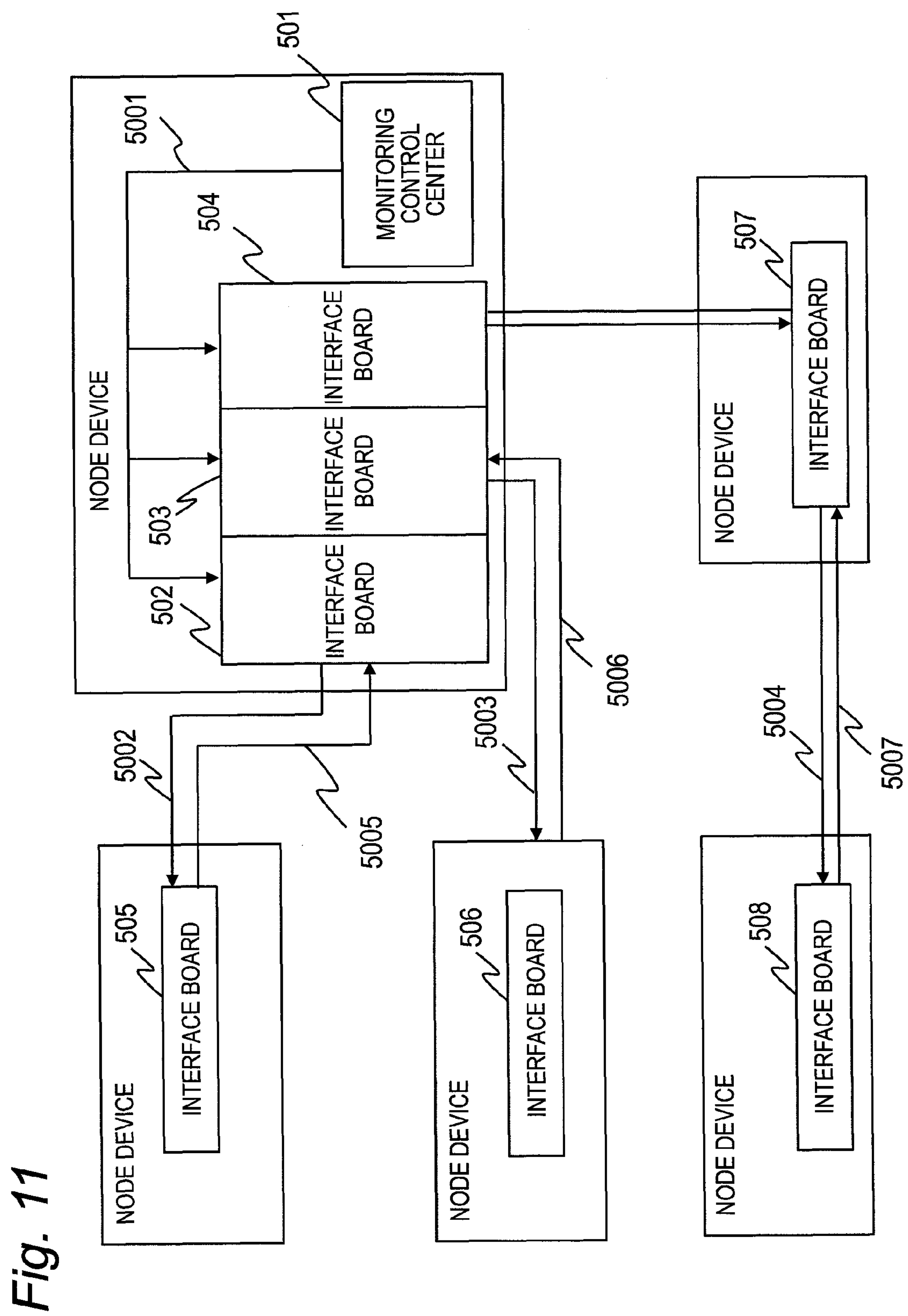
FIG. 11 is a diagram illustrating an operation of obtaining a network configuration from the monitoring control device or the interface board executing the monitoring control on behalf of the monitoring control device.

FIG. 11 is a diagram illustrating an operation of obtaining the network configuration from the monitoring control device or the interface board executing the monitoring control on behalf of the monitoring control device.

The monitoring control device 501 transmits a network configuration investigation request signal 5001 to interface boards 502, 503 and 504 of an own node device (S32 of FIG. 7C). The interface boards 502, 503 and 504 respectively transmit network configuration investigation request signals 5002, 5003 and 5004 to facing interface boards 505, 506 and 507 (S62 of FIG. 8B).

The interface boards 505, 506 transmit network configuration information signals 5005, 5006 including the own ID number and the number of relay stages of 0 to the interface boards 502, 503 (S74 of FIG. 8C), respectively. Since the interface boards 505, 506 are not relay interface boards, the number of relay stages indicating the number of the interface boards through which a signal is routed is 0. The interface boards 502, 503 add the own ID numbers to the received network configuration information signals 5005, 5006 and transmit these signals to the monitoring control device 501 (S83 of FIG. 8D).

Since the interface board 507 having received the network configuration investigation request signal 5004 is a relay interface board, it transfers the network configuration investigation request signal 5004 to the interface board 508 as a relay destination (S73 of FIG. 8C). Since the interface board 508 as a relay destination is not a relay interface board, it transmits a network configuration information signal 5007 including the own ID number and the number of relay stages of 0 to the interface board 507 (S74 of FIG. 8). Since the interface board 507 is a relay interface board, it adds the own ID number to the network configuration information signal 5007, changes the number of relay stages to 1 and transfers the network configuration information signal 5007 to the interface board 504 (S84 of FIG. 8D).

The interface board 504 adds the own ID number to the received network configuration information signal 5007 and transmits this signal to the monitoring control device 501 (S83 of FIG. 8D). The monitoring control device 501 stores the network configuration information signals 5005, 5006 and 5007 in the network configuration information storage unit 204 (S42 of FIG. 7D). The user can understand from the network configuration information that the own node device is PtoP (Peer-to-Peer) connected to the interface boards 505, 506 having returned 0 as the number of relay stages and is connected to the interface board 508 having returned 1 as the number of relay stages via the interface board 507 as a relay station. In this way, the network configuration can be easily and automatically obtained.

According to the above embodiment, the monitoring control replacement unit 310 (replacement unit) of the interface board 206 (or 314) can monitor a plurality of interface boards 206, 314 on behalf of the monitoring control device 106 and independently receive the supply of power. The control unit 308 of the interface board 206 (or 314) starts the monitoring control replacement unit 310 when a fault occurs in the monitoring control device 106 and stops or halts the monitoring control replacement unit 310 when there is no fault in the monitoring control device 106.

Since this causes the monitoring control replacement unit 310 to operate only when a fault occurs in the monitoring control device 106, the interface boards 206, 314 can be efficiently monitored and power consumption used to monitor the interface boards can be suppressed. That is, the redundancy of the monitoring function is possible without wasting power in normal times.

The interface board 206 (or 314) in which the monitoring control replacement unit 310 (replacement unit) has been started transmits a notification indicating the start of the monitoring control replacement unit 310 to the other interface boards 314 (or 206) out of the plurality of interface boards 206, 314. By this notification, the start of the monitoring control replacement units 310 of the other interface boards 314 (or 206) can be prevented. Thus, only one interface board automatically selected out of the plurality of interface boards 206, 314 starts the monitoring control function, wherefore it is possible to simplify a monitoring unit, efficiently monitor the interface boards 206, 314 and suppress power consumption.

The facing interface board 311 transmits the information on the state thereof (operating state information and the network configuration information) to the facing one of the plurality of interface boards 206, 314 by including it in the main signal (data signal) of the optical signal. Since the facing interface board 311 inserts the information on the state of the interface board into the main signal, the interface board 206 (or 314) can monitor the entire network and further automatically obtain the network configuration information even if the facing interface board 311 is not connected to the monitoring network 110 dedicated for the monitoring control. Further, an increase in the traffic of the monitoring network 110 can be suppressed to a minimum level. In this case, if the header part of the main signal is used for the transmission and reception of the information on the state of the interface board, a main signal band is not compressed.

The interface board 206 (or 314) transmits the network configuration investigation request signal requesting the information on the network configuration to the facing interface board 311 by including it in the data signal. The facing interface board 311 returns the information on the network configuration (network configuration information) in response to this request signal by including it in the data signal. In this way, even if a fault occurs in the monitoring control device 106, the interface board 206 (or 314) can investigate the configuration of the network. The facing interface board 311 transmits the number of relay stages as the information on the network configuration (network configuration information). The facing interface board 311 returns the number of relay stages, which is increased by 1, in the case of functioning as a relay interface board. In this way, the network configuration can be easily investigated by grasping the number of relay stages.

The interface board 206 (or 314) in which the monitoring control replacement unit 310 (replacement unit) has started transmits the operating state request signal requesting the notification on the operating state to the other interface boards 314 (or 206) out of the plurality of interface boards 206, 314. The other interface boards 314 (or 206) return the own operating states in response to this request signal. In this way, even if a fault occurs in the monitoring control device 106, the interface board 206 (or 314) can monitor the other interface boards 314 (or 206) provided in the own node device by obtaining the operating states thereof.

The control unit 308 determines the occurrence of a fault in the monitoring control device 106 when receiving no signal from the monitoring control device 106 for a predetermined period. In this way, whether or not any fault has occurred in the monitoring control device 106 can be easily determined.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical communication system comprising:

a plurality of interface boards which transmit and receive optical signals to and from interface boards facing the plurality of interface boards; and a monitoring control device which monitors states of the plurality of interface boards, wherein a first interface board of the plurality of interface boards includes:

a replacement unit capable of monitoring the states of the plurality of interface boards on behalf of the monitoring control device and independently receiving supply of power; and a control unit configured to start the replacement unit in a case where a fault occurs in the monitoring control device and stop or halt the replacement unit in a case where there is no fault in the monitoring control device.

2. The optical communication system according to claim 1, wherein the first interface board in which the replacement unit has started transmits a notification indicating the start of the replacement unit to another interface board of the plurality of interface boards.

3. The optical communication system according to claim 1, wherein a second interface board of the interface boards facing the plurality of interface boards transmits information regarding a state of the second interface board in a data signal of an optical signal to an interface board of the plurality of interface boards which is facing the second interface board.

4. The optical communication system according to claim 3, wherein the first interface board transmits a request signal requesting information on a network configuration to an interface board facing the first interface board by including the request signal in a data signal; and wherein the interface board facing the first interface board returns the information on the network configuration by including the information on the network configuration in a data signal in response to the request signal.

5. The optical communication system according to claim 4, wherein the interface board facing the first interface board returns the number of relay stages as the information on the network configuration; and wherein the interface board facing the first interface board returns the number of relay stages increased by 1 in a case where the interface board facing the first interface board functions as a relay interface board.

6. The optical communication system according to claim 1, wherein the first interface board in which the replacement unit has started transmits a request signal requesting a notification on an operating state to another interface board of the plurality of interface boards; and wherein the another interface board returns an operating state of the another interface board in response to the request signal.

7. The optical communication system according to claim 1, wherein the control unit of the first interface board determines that a fault in the monitoring control device has occurred and starts the replacement unit in a case where the control unit receives no signal from the monitoring control device for a predetermined period.

8. An interface board which transmits and receives optical signals to and from a facing interface board and a state of which is monitored by a monitoring control device, comprising:

a replacement unit capable of monitoring the state of the interface board on behalf of the monitoring control device and independently receiving supply of power; and a control unit configured to start the replacement unit in a case where a fault occurs in the monitoring control device and stop or halting the replacement unit in a case where there is no fault in the monitoring control device.

9. The interface board according to claim 8, wherein the monitoring control device monitors states of other interface boards; and wherein the interface board in which the replacement unit has started transmits a notification indicating the start of the replacement unit to each of the other interface boards.

10. The interface board according to claim 8, wherein the interface board receives information in a data signal of an optical signal transmitted by the facing interface board, the information being on a state of the facing interface board.

11. The interface board according to claim 10, wherein the interface board transmits a request signal requesting information on a network configuration to the facing interface board by including the request signal in a data signal in a case where the replacement unit has started; and wherein the interface board receives the information on the network configuration in the data signal transmitted from the facing interface board in response to the request signal.

12. The interface board according to claim 11, wherein the interface board receives the number of relay stages as the information on the network configuration transmitted from the facing interface board; and wherein the interface board receives the number of relay stages increased by 1 transmitted from the facing interface board in a case where the facing interface board functions as a relay interface board.

13. The interface board according to claim 8, wherein the interface board transmits a request signal requesting a notification on an operating state to another interface board monitored by the monitoring control device before the occurrence of the fault in the monitoring control device in a case where the replacement unit has started; and wherein the interface board receives the operating state of the another interface board from the another interface boards.

14. The interface board according to claim 8, wherein the control unit determines that a fault in the monitoring control device has occurred and starts the replacement unit in a case where the control unit receives no signal from the monitoring control device for a predetermined period.

15. A control method performed in an interface board which transmits and receives optical signals to and from a facing interface board and a state of which is monitored by a monitoring control device, the control method, comprising:

determining whether or not any fault has occurred in the monitoring control device; and starting a replacement unit of the interface board in a case where it is determined that a fault has occurred in the monitoring control device, the replacement unit being capable of monitoring the state of the interface board on behalf of the monitoring control device and independently receiving supply of power.

* * * * *